(12) United States Patent
White et al.

(10) Patent No.: US 8,129,955 B2
(45) Date of Patent: Mar. 6, 2012

(54) RESET MECHANISM FOR A BATTERY PACK

(75) Inventors: Daniel J. White, Baltimore, MD (US);
Daniele C. Brotto, Baltimore, MD (US);
Nathan Cruise, Phoenix, MD (US);
Andrew E. Seman, Jr., White Marsh, MD (US)

(73) Assignee: Black & Decker Inc., Newark, DE (US)

( * ) Notice: Subject to any disclaimer, the term of this patent is extended or adjusted under 35 U.S.C. 154(b) by 908 days.

(21) Appl. No.: 12/170,486

(22) Filed: Jul. 10, 2008

(65) Prior Publication Data

US 2009/0015208 A1 Jan. 15, 2009

Related U.S. Application Data

(60) Provisional application No. 60/959,583, filed on Jul. 13, 2007.

(51) Int. Cl.
*H01M 10/46* (2006.01)
(52) U.S. Cl. .......................... 320/150
(58) Field of Classification Search .......... 320/107, 320/112, 114, 115, 132, 150, 135
See application file for complete search history.

(56) References Cited

U.S. PATENT DOCUMENTS

| | | | |
|---|---|---|---|
| 5,625,273 A | 4/1997 | Fehling et al. | |
| 6,025,699 A | 2/2000 | Cummings | |
| 6,049,144 A | 4/2000 | Frannhagen et al. | |
| 6,437,540 B2 | 8/2002 | Sonobe | |
| 6,563,292 B2 | 5/2003 | Fujiwara | |
| 6,608,468 B2 | 8/2003 | Nagase | |
| 6,768,289 B2 | 7/2004 | Fujiwara | |
| 6,928,381 B2* | 8/2005 | Becker-Irvin et al. | 320/150 |
| 7,095,235 B2 | 8/2006 | Fiebig et al. | |
| 7,336,048 B2 | 2/2008 | Lohr | |
| 2002/0079869 A1 | 6/2002 | Fujiwara | |
| 2003/0141848 A1 | 7/2003 | Fujiwara | |
| 2003/0184308 A1 | 10/2003 | Fiebig et al. | |
| 2006/0001404 A1 | 1/2006 | Ziegler et al. | |
| 2006/0038537 A1 | 2/2006 | Heigl | |
| 2006/0245135 A1 | 11/2006 | Lohr | |
| 2007/0108944 A1 | 5/2007 | Pellenc | |
| 2007/0148539 A1 | 6/2007 | Pellenc | |
| 2007/0164709 A1 | 7/2007 | Tsubaki et al. | |
| 2007/0193762 A1 | 8/2007 | Arimura et al. | |
| 2007/0273328 A1 | 11/2007 | Nam et al. | |
| 2008/0018304 A1 | 1/2008 | Litingtun et al. | |
| 2008/0088280 A1 | 4/2008 | Wan | |

FOREIGN PATENT DOCUMENTS

EP 1 843 445 A1 4/2006
WO WO 2007/118768 10/2007

* cited by examiner

*Primary Examiner* — Edward Tso
(74) *Attorney, Agent, or Firm* — Michael Aronoff; Adan Ayala

(57) ABSTRACT

A battery pack may include a plurality of battery cells; a discharge switch in series with the battery cells, a temperature sensor configured to sense temperature in the battery pack, and a battery control unit adapted to receive a signal indicative of temperature from the temperature sensor and operable to control the switch to interrupt current flow from the battery cells when the temperature exceeds an over-temperature threshold. The battery control unit may be adapted to receive a reset signal and operable to control the switch to restore current flow upon receipt of the reset signal and when the temperature is below an operating temperature threshold.

20 Claims, 5 Drawing Sheets

RESET MECHANISM FOR A BATTERY PACK

CROSS-REFERENCE TO RELATED APPLICATIONS

This application claims the benefit of U.S. Provisional Application No. 60/959,583, filed on Jul. 13, 2007. The disclosure of the above application is incorporated herein by reference.

FIELD

The present disclosure relates to a battery pack and more particularly to a reset mechanism for a battery pack.

BACKGROUND

Over the past few years, lithium-ion (Li-ion) batteries have begun replacing nickel-cadmium (NiCd), nickel-metal-hydride (NiMH), and lead-acid batteries in low-voltage, portable electronic devices such as notebook-type personal computers and cordless power tools. As compared to NiCd and NiMH batteries, Li-ion batteries are lighter but have a larger capacity per unit volume. For this reason, the Li-ion batteries are suitable to low-voltage devices that are preferably light and which are required to endure continuous use for a long time.

Li-ion batteries may rapidly deteriorate when subjected to overcharging, over-discharging, overheating, or over-cooling conditions. A Li-ion battery pack may include functionality to protect against fault conditions inside and outside the battery pack. The present disclosure provides a battery pack configured to shutdown or reduce current flow when subjected to adverse conditions. Further, a reset mechanism is provided to guard against unexpected startup of a device powered by the battery pack after a shutdown event. The reset mechanism may require user interaction to ensure that resetting the battery pack after a shutdown event is done intentionally.

The statements in this section merely provide background information related to the present disclosure and may not constitute prior art.

SUMMARY

In one form, the present disclosure provides a battery pack, which may include a plurality of battery cells, a discharge switch in series with the battery cells, a temperature sensor configured to sense temperature in the battery pack, and a battery control unit adapted to receive a signal indicative of temperature from the temperature sensor and operable to control the switch to interrupt current flow from the battery cells when the temperature exceeds an over-temperature threshold. The battery control unit may be adapted to receive a reset signal and operable to control the switch to restore current flow upon receipt of the reset signal and when the temperature is below an operating temperature threshold.

In another form, the present disclosure provides a system which may include a tool, a battery pack having a plurality of battery cells, the battery pack being adapted to engage the tool and provide electric current thereto, and a battery control unit preventing current flow from the battery cells upon receiving a disable signal. The battery control unit may enable current flow from the battery cells in response to receipt of a reset signal and at least a portion of the battery pack being within a predetermined temperature range.

Further areas of applicability will become apparent from the description provided herein. It should be understood that the description and specific examples are intended for purposes of illustration only and are not intended to limit the scope of the present disclosure.

DRAWINGS

Figure 1:
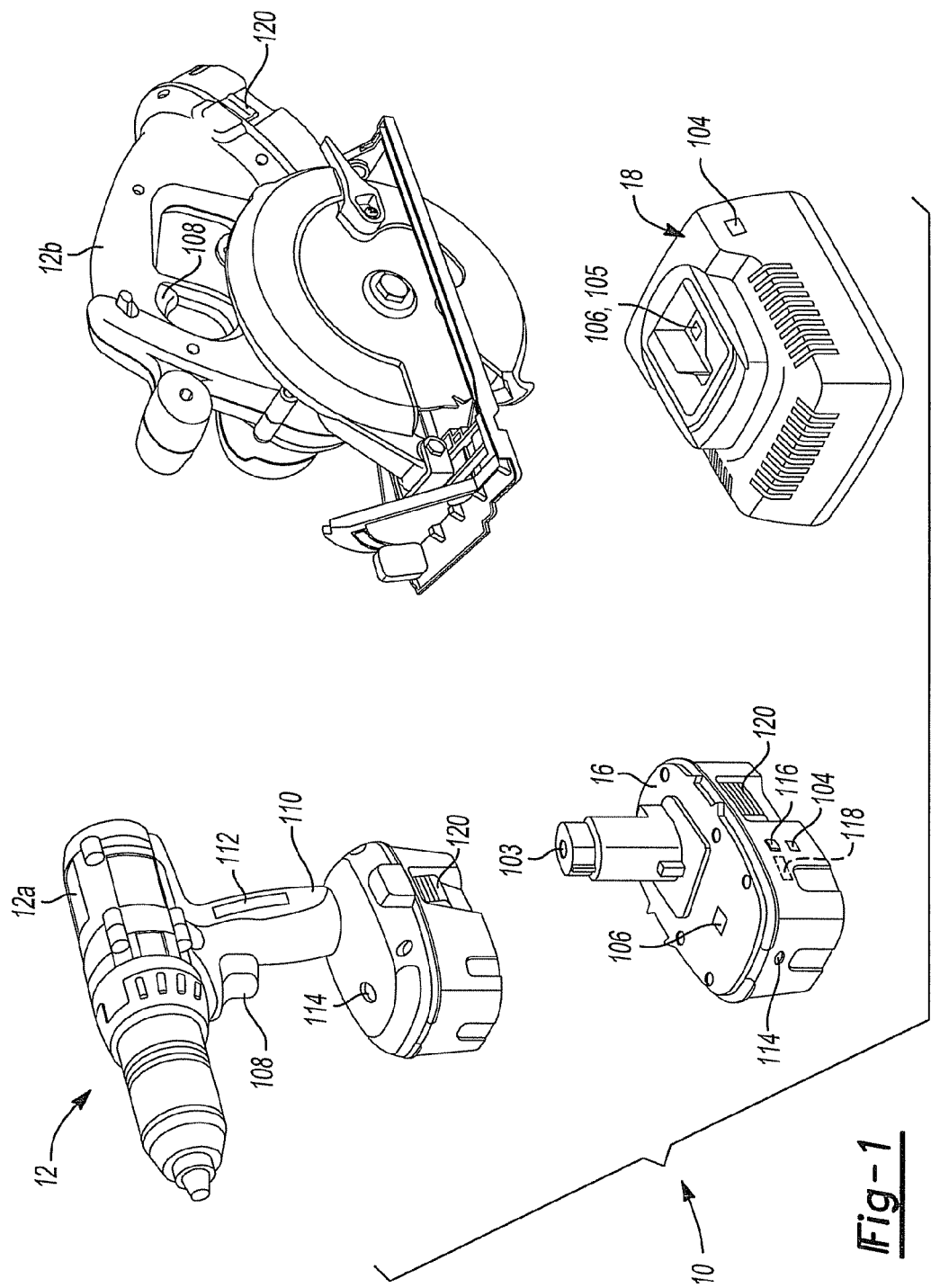
FIG. 1 is a perspective view of exemplary power tools, a battery pack and a charger according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure can relate to a system of power tools of the type that is generally indicated by reference numeral 10 in FIG. 1. The system of power tools 10 can include, for example, one or more power tools 12, a battery pack 16 and a battery pack charger 18. Each of the power tools 12 can be any type of power tool, including without limitation drills, drill/drivers, hammer drill/drivers, rotary hammers, screwdrivers, impact drivers, circular saws, jig saws, reciprocating saws, band saws, cut-off tools, cut-out tools, shears, sanders, vacuums, lights, routers, adhesive dispensers, concrete vibrators, lasers, staplers and nailers. In the particular example provided, the system of power tools 10 includes a first power tool 12a and a second power tool 12b. For example, the first power tool 12a can be a drill/driver similar to that which is described in U.S. Pat. No. 6,431,289, while the second power tool 12b can be a circular saw similar to that which is described in U.S. Pat. No. 6,996,909.

The battery pack 16 can be selectively removably coupled to the first and second power tools 12a and 12b to provide electrical power thereto. Except as otherwise described herein, the battery pack 16 can be configured in a manner that is similar to that which is described in U.S. Patent Application Publication No. 2006/0096771. The battery pack 16 can also be selectively electrically coupled to the battery pack charger 18 to charge the battery pack 16. It is noteworthy that the broader aspects of this disclosure are applicable to other types of battery powered devices.

Figure 2:
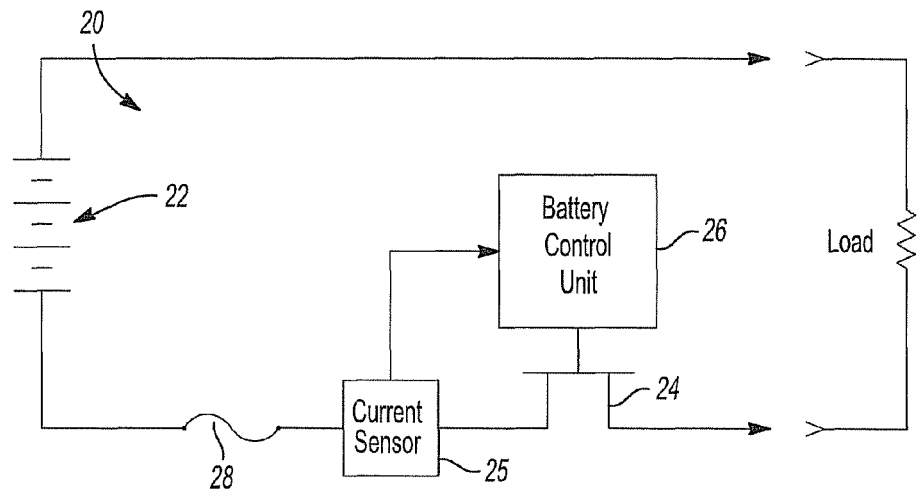
FIG. 2 is a circuit diagram of an overcurrent protection mechanism according to the principles of the present disclosure.

FIG. 2 illustrates an exemplary circuit configuration for an overcurrent protection mechanism 20 integrated into a battery pack 16. The overcurrent protection mechanism 20 is comprised generally of battery cells 22, a switch 24 for controlling discharge of the battery cells, a current sensor 25, and a battery control unit 26. The overcurrent protection mechanism 20 may also include a fuse 28 placed in series with the battery cells. Each of these components is preferably integrated into the battery pack 16. However, it is envisioned that one or more of these components, excluding the battery cells, may be located in a battery charger, a power tool or some other external device operably coupled to the battery pack 16.

The battery pack 16 may include a plurality of battery cells 22 connected in series, and/or a plurality of serially-connected strings of cells, in which the strings are in parallel with one another. For purposes of describing the exemplary embodiments, the battery pack 16 may be composed of cells having lithium-ion cell chemistry. In the context of cordless power tools, the nominal voltage rating of the battery pack is typically 18 volts. However, other voltage ratings are contemplated for different applications. In addition, the battery pack 16 may be composed of cells of a different lithium-based chemistry, such as lithium metal or lithium polymer, or another chemistry such as nickel cadmium (NiCd), nickel metal hydride (NiMH) and lead-acid, for example, in terms of the chemistry makeup of individual cells, electrodes and electrolyte of the pack. Although not limited thereto, the battery pack 16 is preferably rechargeable.

A battery control unit 26 embedded within the battery pack 16 is responsible for protecting the battery cells and monitoring any fault conditions which may develop. In an exemplary embodiment, the battery control unit 26 is implemented in software on a digital microcontroller. However, the battery control unit 26 may be embodied in hardware or software as a digital microcontroller, a microprocessor or an analog circuit, a digital signal processor or by one or more digital ICs such as application specific integrated circuits (ASICs), for example.

Discharge current from the battery cells and charge current to the battery cells can be clamped or discontinued through the use of a switch 24. The switch 24 may be placed in series with the battery cells on the low voltage side of the battery cells. The switch 24 can then be controlled by the battery control unit 26 to interrupt current flow to/from the battery cells. In an exemplary embodiment, the switch 24 is a transistor (e.g., a MOSFET). Other types of switches are also contemplated by this disclosure.

Figure 3:
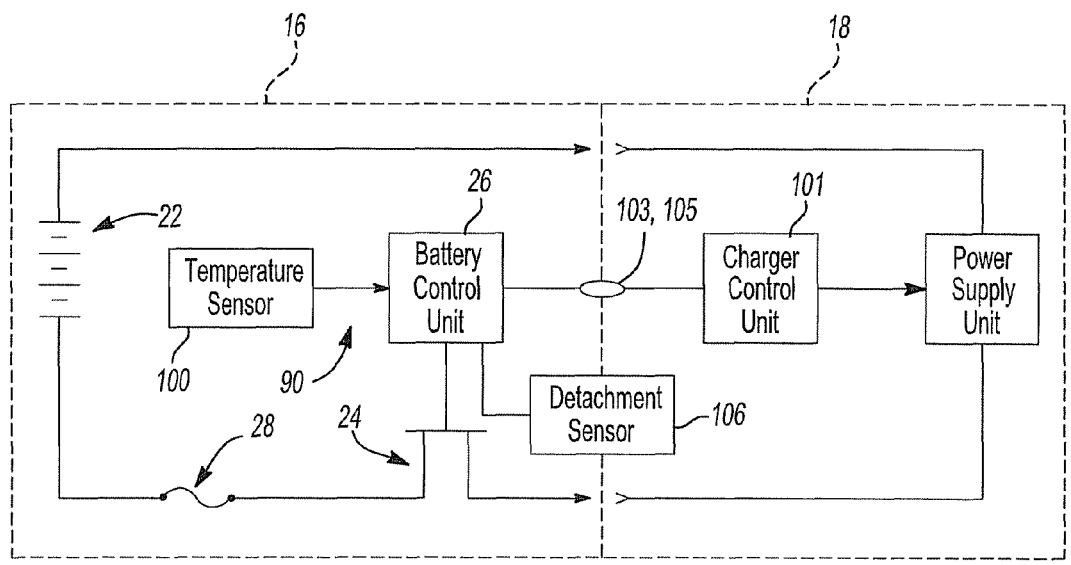
FIG. 3 is a circuit diagram of a battery pack and a charger according to the principles of the present disclosure.
Figure 4:
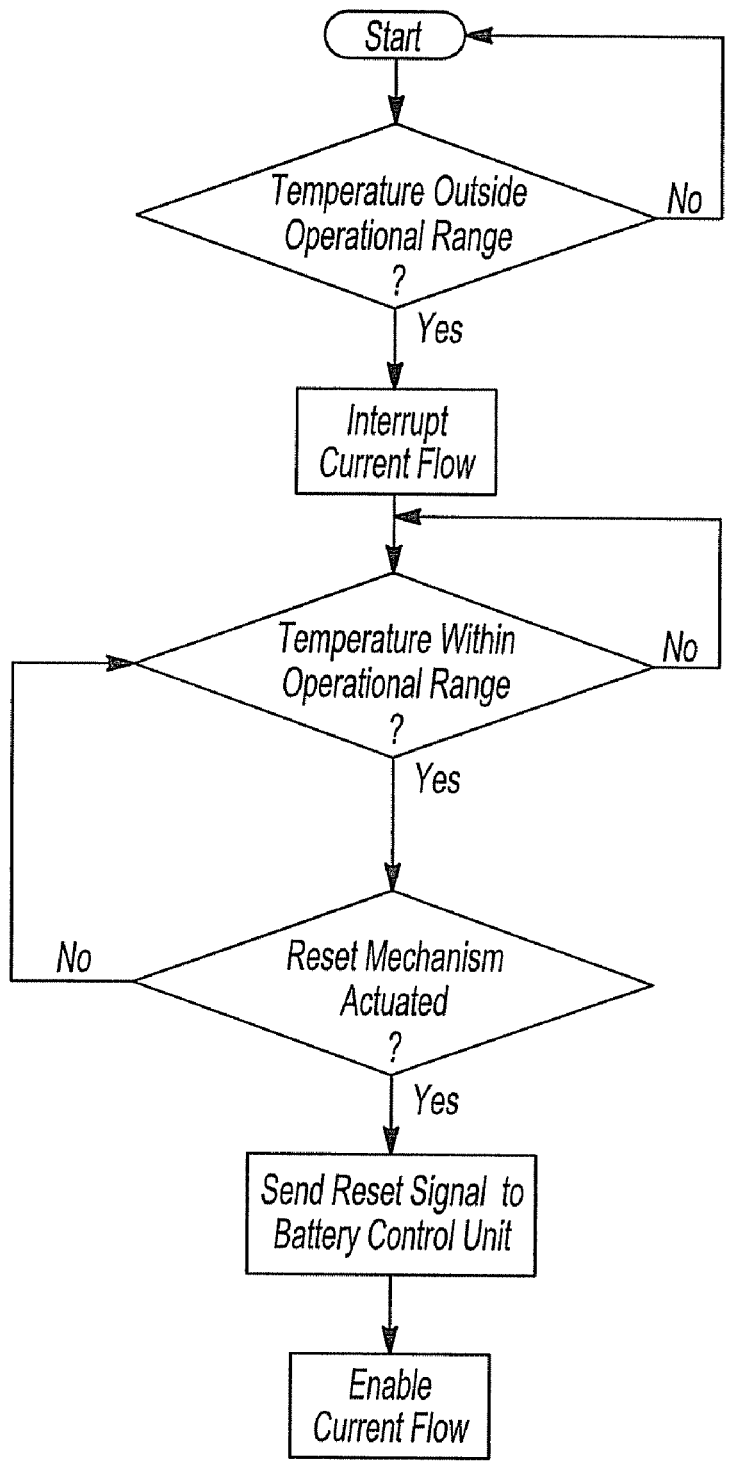
FIG. 4 is a flowchart illustrating the logic of a shutdown mechanism and reset mechanism according to the principles of the present disclosure.

With reference to FIGS. 1, 3 and 4, the power tool 12 and/or the battery pack 16 may include a temperature shutdown mechanism 90. The temperature shutdown mechanism 90 limits the current drawn from the battery pack 16 once the battery pack 16 or power tool 12 becomes overheated. In an exemplary configuration, temperature shutdown mechanism 90 may be implemented by a temperature sensor 100 disposed proximate to battery cells 22 and the battery control unit 26 residing within battery pack 16. It is contemplated that a similar temperature shutdown mechanism may be implemented in the power tool 12.

The temperature sensor 100 is operable to measure the temperature proximate to the battery cells 22 and communicate a signal indicative of the measured temperatures to the battery control unit 26. The temperature sensor 100 can be implemented with a negative temperature coefficient (NTC) thermistor, a positive temperature coefficient (PTC) thermistor, temperature sensing integrated circuits, or thermocouples.

Amongst other functions, the battery control unit 26 is operable to monitor the measured temperature in relation to a predetermined threshold. When the temperature exceeds the threshold, the battery control unit 26 opens switch 24, thereby interrupting current flow to/from the battery cells 22. Once battery pack 16 shuts down due to overheating, it generally takes a period of time for battery pack 16 to cool. While the following description makes reference to a thermal shutdown condition, it is contemplated that the reset feature described below and other aspects of this disclosure work in conjunction with other types of shutdown conditions.

The system 10 may include a reset feature to protect the enduser from unexpectedly starting the power tool 12 after a thermal shutdown event. In an exemplary embodiment, the battery control unit 26 maintains an indication of a thermal shutdown event. When a thermal shutdown event occurs, the battery control unit 26 sets the indicator to a disable state. The battery control unit 26 may also receive a message indicative of a thermal shutdown event occurring in the tool and set the indicator in response to this message. The indicator must be reset to an operational state before current flow from the battery may resume. Various techniques for resetting the indicator are contemplated by this disclosure.

In one exemplary embodiment, the battery pack 16 must be disconnected from the power tool 12 and placed into a battery charger 18 before current flow from the battery is allowed to resume. The charger control unit 101 within charger 18 communicates with battery control unit 26 in the battery pack 16 to reset the indicator. To provide communication between battery control unit 26 and charger control unit 101, terminals 103 and 105 formed on battery pack 16 and charger 18, respectively, may be provided. Once battery pack 16 is placed in the battery charger 18, the charger control unit 101 communicates with battery control unit 26 to reset the indicator to an operational state. The enduser is then free to disconnect battery pack 16 from charger 18 and operably couple battery pack 16 to power tool 12. Use of power tool 12 may then resume.

The battery control unit 26 may further require the temperature of the cells to return to a safe operating range before enabling the indicator to be reset. In other words, the battery control unit 26 will reset the indicator once the temperature returns to an acceptable range and the pack has been placed in the charger 18. Accordingly, the enduser is prevented from simply resetting battery pack 16 and attempting to reuse power tool 12 prior to a temperature of battery cells 22 returning to an operational range.

To notify the enduser, battery pack 16 or battery charger 18 may be configured with an indicator device 104 that indicates that battery pack 16 has returned to an operational state. Indicator device 104 may be an audible indicator or a visible indicator. For example, an audible indicator may emit a beep or ring and a visible indicator may be an LED. Once the audible indicator or the visual indicator signal that battery pack 16 has returned to an operational state, the enduser may remove battery pack 16 from charger 18 and operably couple battery pack 16 to power tool 12. Since battery pack 16 has sufficiently cooled and been reset, power may be restored to power tool 12 without delay.

The battery pack 16, power tool 12, and/or charger 18 may also include a detachment sensor 106 (FIGS. 1 and 3). The detachment sensors 106 may be configured to sense the battery pack 16 being disconnected from the power tool 12 and/or from the charger 18. Once the battery pack 16 has returned to an operational temperature, the enduser may remove the battery pack 16 from the power tool 12 or charger 18 to cause the detachment sensor 106 to send a reset signal to the battery control unit 26. Thereafter, the battery pack 16 may be reconnected to the power tool 12 and use of the power tool 12 may resume. The detachment sensor 106 can be any suitable sensor such as an optical sensor, a magnetic sensor (e.g., a Hall sensor), a mechanical switch, or an electrical sensor that senses voltage, resistance or capacitance on the terminal 103 of the battery pack 16, for example.

Figure 5:
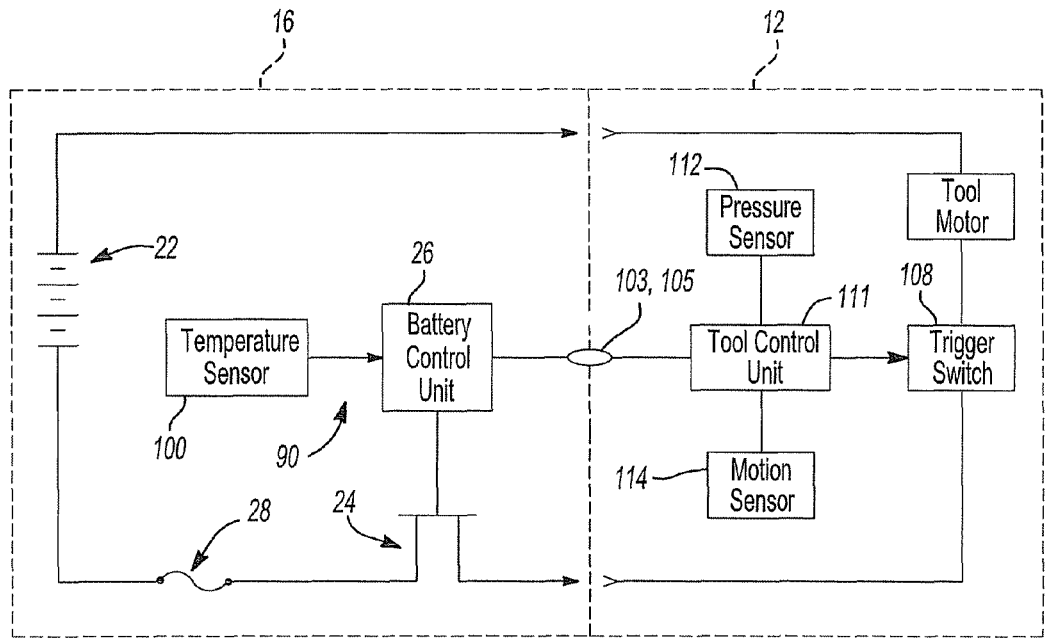
FIG. 5 is a circuit diagram of the battery pack and the power tool according to the principles of the present disclosure.

Referring now to FIGS. 1 and 5, the power tool 12 may include a trigger switch 108 disposed on or proximate to a grip 110 of the power tool 12. The trigger switch 108 may be in electrical communication with a tool motor and a tool control unit 111. The enduser may cycle the trigger switch 108 of the power tool 12 to cause the tool control unit 111 to send the reset signal to the battery control unit 26. For example, the enduser may repeatedly actuate (or cycle) the trigger switch 108 a predetermined number of times within a predetermined amount of time to cause the reset signal to be sent to the battery control unit 26, provided the battery pack 16 has first returned to an operational temperature. Stated another way, once the battery pack 16 reaches an operational temperature, the enduser can reset the indicator by cycling the trigger switch 108 and then resume normal use of the power tool 12 as desired.

Additionally or alternatively, the power tool 12 may include a pressure sensor 112. The pressure sensor 112 may be disposed on the grip 110, and may be in electrical communication with the tool control unit 111. The pressure sensor 112 may be configured to detect handling of the power tool 12. The pressure sensor 112 may sense whether the enduser has handled the power tool 12 within a predetermined amount of time. The predetermined amount of time may be between five and ten minutes, for example, or any other length of time sufficient for the battery pack 16 to cool. In response to a thermal shutdown event, the enduser may allow the power tool 12 to sit idly while the battery pack 16 returns to an operational temperature. If the pressure sensor 112 determines that the power tool 12 has not been handled for the predetermined amount of time, the battery control unit 26 may receive the reset signal, and use of the power tool 12 may resume.

Additionally or alternatively, the power tool 12 and/or the battery pack 16 may include a motion sensor 114 in electrical communication with the tool control unit 111 (FIGS. 1 and 5). The motion sensor 114 may detect whether the power tool 12 or battery pack 16 is being moved or is sitting idly. The motion sensor 114 can be any suitable sensor such as, for example, an optical sensor or mechanical sensor. After a thermal shutdown event, if the motion sensor 114 determines that the power tool 12 and/or battery pack 16 have remained motionless for a predetermined amount of time to allow the battery pack 16 to return to an operational temperature, the battery control unit 26 may receive a reset signal, and use of the power tool 12 may resume.

Figure 6:
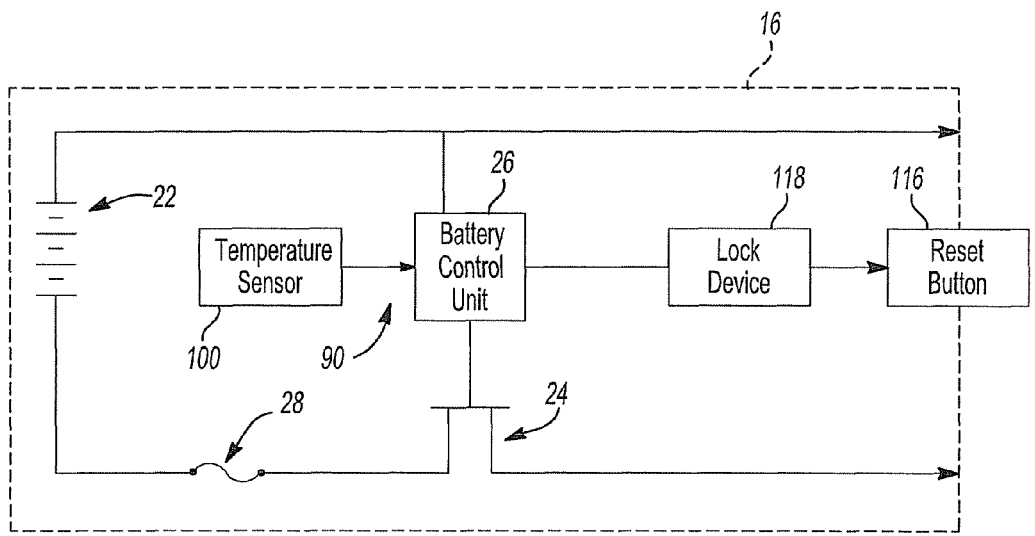
FIG. 6 is a circuit diagram of a battery pack including a reset button according to the principles of the present disclosure.

Referring now to FIGS. 1 and 6, a reset button 116 may be disposed on a housing of the battery pack 16. The reset button 116 may be in electrical communication with the battery control unit 26. Once the battery pack 16 has returned to an operational temperature after a thermal shutdown event, the enduser may depress the reset button 116 to send a reset signal to the battery control unit 26. The battery control unit 26 may then reset the indicator and use of the power tool 12 may resume. It should be appreciated that the reset button 116 may be depressed to reset the indicator while the battery pack 16 is engaged or disengaged with the power tool 12 or the charger 18.

The battery pack 16 may also include a locking device 118 operable to engage the reset button 116. The locking device 118 may be disposed in an outer housing of the battery pack 16, proximate to the reset button, as schematically illustrated in FIG. 1. The locking device 118 may be any suitable electromechanical mechanism adapted to prevent the reset button 116 from being depressed. The locking device 118 may be in communication with the battery control unit 26. In response to a thermal shutdown event, the battery control unit 26 may cause the locking device 118 to engage the reset button 116, thereby preventing the reset button 116 from being depressed while the battery pack 16 is outside of the operational temperature range. Once the battery pack 16 returns to an operational temperature, the battery control unit 26 may cause the locking device 118 to disengage the reset button 116, allowing the enduser to depress the reset button 116 to reset the indicator. It is also envisioned that the reset button 116 and locking device 118 could be disposed on the power tool 12 and/or the charger 18.

Figure 7:
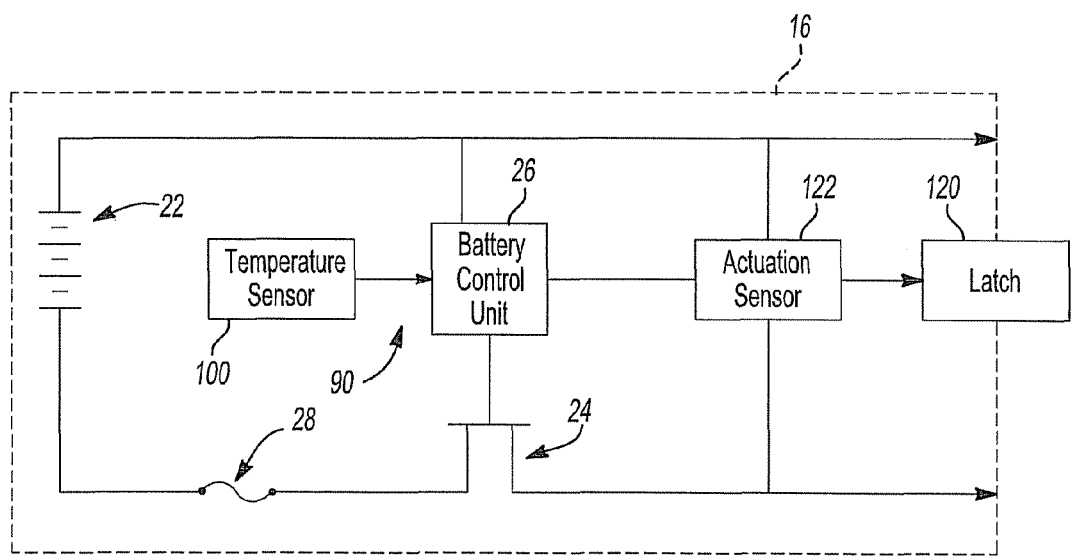
FIG. 7 is a circuit diagram of a battery pack including a latch and a latch actuation sensor according to the principles of the present disclosure.

Referring now to FIGS. 1 and 7, the battery pack 16 may include a latch 120 adapted to releasably secure the battery pack 16 to the power tool 12. A latch actuation sensor 122 may detect whether the latch 120 is engaging the power tool 12. The latch actuation sensor 122 may be an optical sensor, a magnetic sensor (e.g., a Hall sensor), a mechanical sensor, an electrical sensor or any other suitable sensor. The latch actuation sensor 122 may be in electrical communication with the battery control unit 26.

The system 10 may be configured such that disengagement of the latch 120 from the power tool 12 causes the battery control unit 26 to receive the reset signal. For example, once the battery pack 16 returns to an operational temperature after a thermal shutdown event, the enduser may disengage the battery pack 16 from the power tool 12 by actuating the latch 120. The latch actuation sensor 122 may sense the latch 120 disengaging the power tool 12 and send the reset signal to the battery control unit 26. The battery control unit 26 may then close the switch 24 to enable current flow to and from the battery pack 16.

It should be understood that a thermal shutdown event includes conditions whereby the battery pack 16 rises above or drops below an operational temperature range. Accordingly, the temperature shutdown mechanism 90 may cause a thermal shutdown event in response to the battery pack 16 being too cold. The various reset mechanisms described herein may be subsequently applied to enable or restore current flow to and from the battery pack 16 after the battery pack 16 warms up to a temperature within the operational temperature range of the battery pack 16.

The description of the present disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A battery pack comprising:
   a plurality of battery cells;
   a discharge switch in series with the battery cells;
   a temperature sensor configured to sense temperature in the battery pack; and
   a battery control unit adapted to receive a signal indicative of temperature from the temperature sensor and operable to control the switch to interrupt current flow from the battery cells when the temperature exceeds an over-temperature threshold, the battery control unit adapted to receive a reset signal and operable to control the switch to restore current flow upon receipt of the reset signal and when the temperature is below a first operating temperature threshold.

2. The battery pack of claim 1, wherein the battery control unit receives the reset signal from a battery charger operably coupled to the battery pack.

3. The battery pack of claim 1, further comprising a user-actuated reset mechanism accessible on an exterior of the battery pack to generate the reset signal.

4. The battery pack of claim 3, wherein the reset mechanism further comprises a button and a locking mechanism that prevents compression of the button when the temperature exceeds the first operating temperature threshold.

5. The battery pack of claim 1, further comprising a latch mechanism configured to couple the battery pack to a power tool and a latch sensing mechanism configured to determine when the latch mechanism is actuated and generate the reset signal when the latch mechanism is unlatched.

6. The battery pack of claim 1, wherein the battery control unit receives the reset signal from a power tool operably coupled to the battery pack.

7. The battery pack of claim 1, wherein the battery control unit receives the reset signal from the power tool when a trigger switch of the power tool has been cycled.

8. The battery pack of claim 1, wherein the battery control unit controls the switch to restore current flow when the temperature is above a second operating temperature threshold and the battery control unit has received the reset signal.

9. A system comprising:
a tool;
a battery pack having a plurality of battery cells, the battery pack being adapted to engage the tool and provide electric current thereto; and
a battery control unit preventing current flow from the battery cells upon receiving a disable signal, the battery control unit enabling current flow from the battery cells in response to receipt of a reset signal and at least a portion of the battery pack being within a predetermined temperature range.

10. The system of claim 9, further comprising a battery charger having a charger control unit adapted to communicate with the battery control unit.

11. The system of claim 10, wherein the charger control unit sends the reset signal to the battery control unit in response to engagement between the charger and the battery pack.

12. The system of claim 9, wherein engagement between a battery charger and the battery pack causes the battery control unit to receive the reset signal.

13. The system of claim 9, wherein the battery control unit receives the reset signal in response to the battery pack being decoupled from a battery charger.

14. The system of claim 9, wherein the tool sends the reset signal to the battery control unit.

15. The system of claim 9, wherein the reset signal is sent to the battery control unit in response to cycling a trigger of the tool.

16. The system of claim 9, further comprising a reset button, wherein actuation of the reset button causes the reset signal to be sent to the battery control unit.

17. The system of claim 16, further comprising a locking mechanism preventing actuation of the reset button in response to a predetermined temperature of the battery pack.

18. The system of claim 9, wherein the reset signal is sent to the battery control unit in response to the battery pack being decoupled from the tool.

19. The system of claim 9, wherein the reset signal is sent to the battery control unit in response to the battery pack engaging the tool.

20. The system of claim 9, wherein a sensor causes the reset signal to be sent in response to the tool sitting idle for a predetermined length of time.

* * * * *